(No Model.)

J. KILLINGER.
HOOK.

No. 445,895. Patented Feb. 3, 1891.

WITNESSES
George W. Dale
Oliver N. Sisson.

INVENTOR
John Killinger,
By his Attorney
Vin de Powell.

UNITED STATES PATENT OFFICE.

JOHN KILLINGER, OF WAYNE, PENNSYLVANIA.

HOOK.

SPECIFICATION forming part of Letters Patent No. 445,895, dated February 3, 1891.

Application filed September 9, 1890. Serial No. 364,428. (No model.)

*To all whom it may concern:*

Be it known that I, JOHN KILLINGER, a citizen of the United States, residing at Wayne, in the county of Delaware and State of Pennsylvania, have invented certain new and useful Improvements in Hooks; and I do hereby declare that the following is a full, clear, and exact description of the invention.

My invention has particular reference to that class of adjuncts to wearing-apparel known as "hooks and eyes," although having reference generally to hooks of every character and for whatsoever purpose, and has for its object to improve the construction and increase the efficiency of the same.

My invention consists of a hook provided with a spring-tongue which at its main portion is coextensive with the main portion or shank of the hook, and which is bent or turned upon itself at a point outside the bend of the hook and brought into close relation with its main portion, leaving a slight space at such point, through which is forced against the inherent resiliency of the tongue the eye or other device, forming in effect a snap-hook. The advantages of this construction are that, by reason of the fact that the eye enters the hook at a point adjacent to the shank of the latter, there can be no widening of the space at such entrance by the forcing outwardly of the end of the hook under strain in use, as is the case where the eye enters the hook at a point adjacent to such end. Furthermore, by reason of the fact that the bend of the spring-tongue is outside of and not coincident with the bend of the hook, there can be no strain exerted on such tongue by the eye and the consequent widening of the space through which said eye enters, as would result from the coincidence of the turns of the hook and tongue.

Figure 1:
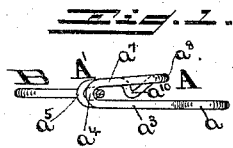
Figure 2:
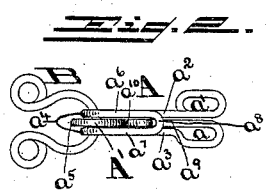

In the accompanying drawings, which fully illustrate the details of my invention, Figure 1 is a side elevation of the improved hook in engagement with an eye, the latter being partly in section. Fig. 2 is a plan view of the improved hook and an eye in engagement, and Fig. 3 is a front elevation of the improved hook applied to a buckle.

A represents the improved hook, which, as to its outer configuration, is similar to that of the ordinary form of hook, being formed of one continuous piece of spring-wire turned and doubled upon itself into the proper shape. Instead, however, of bringing the parallel side portions of the hook into contiguous or close relation, as in the ordinary form of hook, such portions are arranged at such distance apart as to leave a central longitudinal space between them of a width slightly greater than the thickness of the wire, which space allows of freedom of play between said side portions of the spring-tongue A', which latter is formed of a continuation of the hook-wire after the formation of the eye $a$, as shown in Fig. 2 of the drawings, instead of terminating at such eye, as at eye $a'$, such continuation extending parallel with and between the side portions $a^2 a^3$ of the hook to a point beyond the bend $a^4$ of the latter, where it is bent upwardly, as at $a^5$, and similarly to $a^4$, and then extends backwardly for a short distance parallel with and between the side portions $a^6 a^7$ of the end $a^8$ of the hook, whereupon it is bent downwardly toward and almost to the straight or main portion $a^9$ of the tongue A', leaving a slight space between, and then upwardly again, forming the elbow $a^{10}$, and terminating just within the outer edge of the end of the hook, the portion of the elbow nearest the tongue-bend $a^5$ being very much nearer the vertical than the other side of such elbow, the purpose of which being to facilitate the entrance of an eye or other device through the space between the elbow and the straight or main portion of the tongue against the resistance offered by the spring of the latter, after which entrance the accidental exit or disengagement of said eye or the like will be prevented by the abrupt side of the elbow.

B represents an eye of the usual form and in engagement with the hook A, having been forced easily through the space between the elbow and main portion of the tongue and resting at its center against the inner side of the bend of the hook, which bend receives all the strain exerted thereon by the eye or both hook and eye pulling in opposite directions when in use, and the bend of the tongue, being beyond or outside of the line of said inner side, is clear of such strain and free from contact with the eye B, the result being that there will be no distention or widening of the space through which the eye passes to an extent greater than the thickness of the latter, or to any extent, and thus preventing a spring or snapping action, owing to the independence of the tongue and hook, the former always remaining in its normal position no matter how distorted the hook may become. Also, by reason of the fact that such space is between the tongue and the main portion instead of the end of the hook, such end may be forced, as results inevitably from use, outwardly to any extent without impairing the usefulness of the tongue.

Figure 3:
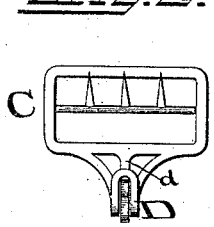

In Fig. 3 of the drawings is shown a modification of my invention, illustrating the application of the improved hook to a suspender or other buckle C, the tongue d being formed integral with the buckle-frame, as are the sides of the hook D, such sides and tongue being stamped or otherwise formed in the flat and then turned or bent into the proper shape.

I am aware that a spring-tongue intermediate the side bars of a hook for the purpose of producing a snapping action in the latter has been heretofore employed. Therefore I do not wish to be understood as claiming the same broadly.

What I claim, and desire to secure by Letters Patent, is—

1. In a hook, the combination of a hook portion and a spring-tongue, the latter being bent back at a point outside of or beyond the bend of the former and having therein an offset in close relation with its main or shank portion, substantially as specified.

2. In a hook, the combination of a hook portion formed of substantially parallel side bars and a spring-tongue intermediate said side bars, said tongue being bent back at a point outside of or beyond the bends of the side bars and having therein an offset in close relation with its main or shank portion, substantially as specified.

In testimony that I claim the foregoing I have hereunto set my hand this 6th day of September, A. D. 1890.

JOHN KILLINGER.

Witnesses:
R. DALE SPARHAWK,
WM. H. POWELL.